(No Model.)

W. H. LASHER, Jr.
BARREL LIFTER.

No. 539,690. Patented May 21, 1895.

WITNESSES
G. S. Elliott
T. W. Johnson

William H. Lasher, Jr.
INVENTOR by
Attorney

United States Patent Office.

WILLIAM H. LASHER, JR., OF GERMANTOWN, NEW YORK.

BARREL-LIFTER.

SPECIFICATION forming part of Letters Patent No. 539,690, dated May 21, 1895.

Application filed April 4, 1895. Serial No. 544,477. (No model.)

*To all whom it may concern:*

Be it known that I, WILLIAM H. LASHER, Jr., a citizen of the United States of America, residing at Germantown, in the county of Columbia and State of New York, have invented certain new and useful Improvements in Barrel-Lifters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a simple, cheap and efficient means or implement for lifting barrels; and it consists of a barrel lifter made up from a single plate of sheet-metal of proper configuration having an aperture or opening therein, one end of the plate being rolled upon itself to form a grasping portion or hand-hold which will permit the fingers to pass through the plate so as to secure a firm grip upon the handle and the other end bent into a hook to engage with the chine of a barrel, a curved portion being provided above the hooked end so as to set the handle of the device away from the side of the barrel when in use, all as will be hereinafter fully set forth and particularly pointed out in the claim.

Figure 1:
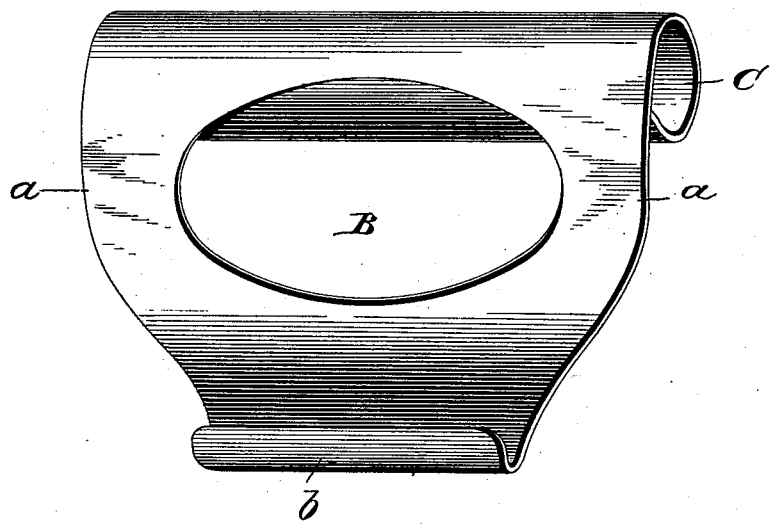
Figure 2:
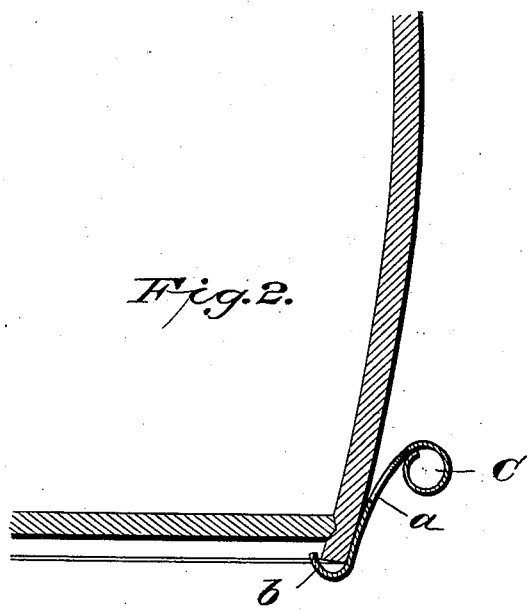

In the accompanying drawings forming part of this specification, Figure 1 is a perspective view of a barrel-lifter constructed in accordance with my invention, and Fig. 2 is a side view showing the application thereof to a barrel.

The device is made up from a single plate of sheet-metal of suitable resiliency, the side edges *a a* being substantially parallel and one end being cut away to reduce the width of the same. The plate before being bent into form is cut away about centrally to provide an oval or oblong opening B, and below this opening the plate is curved to present a projecting portion which will abut against the side of the barrel above the chine, while the lower end is formed into a hook *b* which engages with the chine. The other end of the plate is rolled upon itself to provide a tubular handle, the end of the plate lying above the opening B. The tubular handle is designated by the letter C.

This device is simple in construction, and it will be noted that by reason of the special construction and manner of bending the plate the hook and handle are positioned to one side of each other or out of line vertically, and an efficient grasping handle is provided which when in use will not bring the fingers of the user against the side of the barrel, the only parts of the device which contact with the barrel being the hook which engages the chine and the curved portion below the opening.

Having thus described my invention, what I claim as new, and desire to secure by Letters Patent, is—

As an improved article of manufacture, a barrel lifter made up from a single plate of metal, and provided with a central opening, above said opening with a handle formed by rolling the metal upon itself, and below the opening with a curved portion and hook, substantially as shown and described.

In testimony whereof I affix my signature in presence of two witnesses.

WILLIAM H. LASHER, JR.

Witnesses:
J. WEBSTER MILLER,
CHARLES H. HOVER.